US011036424B2

(12) United States Patent
Tal et al.

(10) Patent No.: US 11,036,424 B2
(45) Date of Patent: Jun. 15, 2021

(54) GARBAGE COLLECTION IN A DISTRIBUTED STORAGE SYSTEM

(71) Applicant: THE SILK TECHNOLOGIES ILC LTD, Yokne'am ILIT (IL)

(72) Inventors: Doron Tal, Haifa (IL); Eyal Gordon, Haifa (IL); Eran Mann, Yoqneam (IL)

(73) Assignee: THE SILK TECHNOLOGIES ILC LTD, Yokne'am ILIT (IL)

( * ) Notice: Subject to any disclaimer, the term of this patent is extended or adjusted under 35 U.S.C. 154(b) by 95 days.

(21) Appl. No.: 15/968,944

(22) Filed: May 2, 2018

(65) Prior Publication Data

US 2018/0335972 A1 Nov. 22, 2018

Related U.S. Application Data

(60) Provisional application No. 62/507,869, filed on May 18, 2017.

(51) Int. Cl.
G06F 3/06 (2006.01)

(52) U.S. Cl.
CPC ............ G06F 3/0652 (2013.01); G06F 3/067 (2013.01); G06F 3/0608 (2013.01)

(58) Field of Classification Search
CPC ...................................... G06F 3/067
See application file for complete search history.

(56) References Cited

U.S. PATENT DOCUMENTS

| 6,993,770 | B1* | 1/2006 | Detlefs | G06F 9/526 707/999.103 |
| 9,110,790 | B1* | 8/2015 | Joyce | G06F 12/0253 |
| 10,078,453 | B1* | 9/2018 | Li | G06F 3/0685 |
| 10,248,345 | B1* | 4/2019 | Dickson | G06F 16/10 |
| 2002/0099765 | A1* | 7/2002 | Otis | G06F 12/0276 709/203 |
| 2008/0010433 | A1 | 1/2008 | Fluhr et al. | |
| 2009/0172258 | A1 | 7/2009 | Olbrich et al. | |
| 2010/0185830 | A1* | 7/2010 | Asnaashari | G06F 12/0246 711/206 |
| 2012/0042146 | A1* | 2/2012 | Gandhi | G06F 3/0611 711/165 |
| 2012/0066193 | A1* | 3/2012 | King | G06F 12/0269 707/704 |
| 2013/0282676 | A1* | 10/2013 | Wade | G06F 3/064 707/692 |
| 2014/0006354 | A1 | 1/2014 | Parkison et al. | |
| 2014/0052953 | A1 | 2/2014 | Ben-Tsion et al. | |
| 2015/0106140 | A1* | 4/2015 | Biewald | G06Q 10/06 705/7.12 |
| 2016/0004631 | A1* | 1/2016 | Hayes | G06F 16/00 711/103 |
| 2016/0364707 | A1* | 12/2016 | Varma | G06F 21/50 |
| 2017/0132172 | A1* | 5/2017 | Romem | G06F 16/30 |

* cited by examiner

Primary Examiner — Eliyah S. Harper
(74) Attorney, Agent, or Firm — Wiggin and Dana LLP; Gregory S. Rosenblatt; Jonathan D. Hall

(57) ABSTRACT

The presently disclosed subject matter includes various inventive aspects, which are directed for enabling execution of garbage collection process in a distributed storage-system.

12 Claims, 3 Drawing Sheets

GARBAGE COLLECTION IN A DISTRIBUTED STORAGE SYSTEM

FIELD OF THE PRESENTLY DISCLOSED SUBJECT MATTER

The presently disclosed subject matter is related to the field of computer storage systems and to the implementation of garbage collection in a computer storage system.

BACKGROUND

Garbage collection is a form of automatic memory management and is typically performed in data storage systems for relocating valid data from fragmented storage locations to different storage space, thereby creating larger empty storage space for storing new data.

SUMMARY

The presently disclosed subject matter includes methods and systems enabling execution of garbage collection in a distributed computer storage-system.

According to one aspect of the presently disclosed subject matter there is provided a method of garbage collection in a storage system, the storage system comprising multiple computer devices operatively connected to a shared physical storage space of the storage system operable by the multiple computer devices, each computer device being assigned with write access to a respective storage area in the shared physical storage space, the method comprising:

executing a garbage collection process on a storage segment, the write access of the storage segment being assigned to a first computer device in the storage system, the storage segment storing data owned by at least a second computer device, including:

reading, by one or more authorized computer devices, the data stored in the storage segment;

persisting, by the at least second computer device, the data owned thereof; and in response to receiving a confirmation at the first computer device that the data is persistent, designating, by the first computer device, the storage segment as free storage space available for writing by the first computer device.

In addition to the above features, the method according to this aspect of the presently disclosed subject matter can optionally comprise one or more of features (i) to (vii) below, in any technically possible combination or permutation.

i. The at least second computer device can include a plurality of computer devices, and the data can include different data portions respectively owned by the plurality of computer devices. The persisting step can comprise persisting, respectively by the plurality of computer devices, different data portions owned thereof.

ii. The one or more authorized computer devices can be the at least second computer device.

iii. The one or more authorized computer devices can be different from the at least second computer device, and the method can further comprise sending, by the one or more authorized computer devices, the data to the at least second computer device.

iv. The one or more authorized computer devices can include the first computer device.

v. The persisting can comprise writing, by the at least second computer device, the data owned thereof to a storage medium owned by the at least second computer device.

vi. The storage medium can be free storage space in the storage system.

vii. The method can further comprise writing, by the first computer device, new data into the storage segment.

According to another aspect of the presently disclosed subject matter there is provided a distributed data-storage system comprising multiple computer devices operatively connected to a shared physical storage space of the data-storage system operable by the multiple computer devices, each computer device being assigned with write access to a respective storage area in the shared physical storage space, the data-storage system configured to:

execute a garbage collection process on a storage segment, the write access of the storage segment being assigned to a first computer device in the data-storage system, the storage segment storing data owned by at least a second computer device in the data-storage system, wherein:

one or more authorized computer devices in the data-storage system is configured to read the data stored in the storage segment;

the at least second computer device is configured to persist the data owned thereof; and the first computer device is configured to, in response to receiving a confirmation that the data is persistent, designate the storage segment as free storage space available for writing by the first computer device.

According to another aspect of the presently disclosed subject matter there is provided a distributed data-storage system comprising multiple computer devices operatively connected to a shared physical storage space of the data-storage system operable by the multiple computer devices, each computer device being assigned with write access to a respective storage area in the shared physical storage space, a first computer device in the data-storage system configured to:

execute a garbage collection process on a storage segment, the write access of the storage segment being assigned to the first computer device, the storage segment storing data owned by at least a second computer device, wherein the first computer device is configured to:

cause the data stored in the storage segment to be read and sent to the at least second computer device to be persisted; and in response to receiving a confirmation from the at least second computer device that the data is persistent, designate the storage segment as free storage space available for writing by the first computer device.

According to another aspect of the presently disclosed subject matter there is provided non-transitory computer readable storage medium tangibly embodying a program of instructions that, when executed by a computer, causing the computer to perform a method of garbage collection in a storage system, the storage system comprising multiple computer devices operatively connected to a shared physical storage space of the storage system operable by the multiple computer devices, each computer device being assigned with write access to a respective storage area in the shared physical storage space, the method comprising:

executing a garbage collection process on a storage segment, the write access of the storage segment being assigned to a first computer device in the storage system, the storage segment storing data owned by at least a second computer device, including:

reading, by one or more authorized computer devices, the data stored in the storage segment;

persisting, by the at least second computer device, the data owned thereof; and in response to receiving a confirmation at the first computer device that the data is persistent, designating, by the first computer device, the storage segment as free storage space available for writing by the first computer device.

The data-storage systems, the non-transitory computer readable storage medium disclosed herein according to various aspects, can optionally further comprise one or more of features (i) to (vii) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
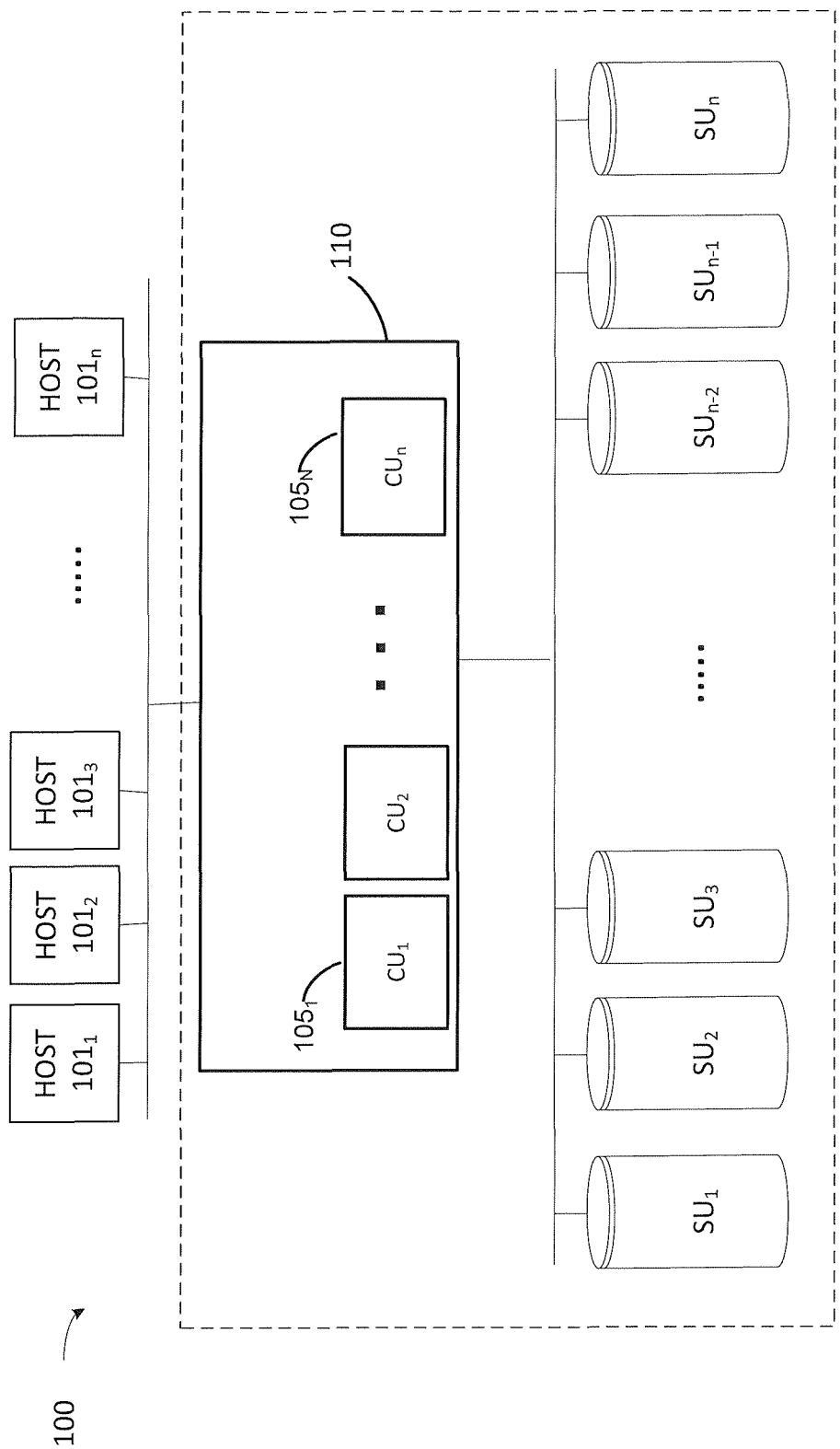
FIG. 1 is a schematic block-diagram illustration of a computer storage system according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Unless specifically stated otherwise, as apparent from the following discussions, it is appreciated that throughout the specification discussions utilizing terms such as "receiving", "executing", "reading", "persisting", "writing", "designating", or the like, include actions and/or processes of a computer that manipulate and/or transform data into other data, said data represented as physical quantities, e.g. such as electronic quantities, and/or said data representing the physical objects.

The terms "computer", "computer device", "control unit", "server" or the like as disclosed herein should be broadly construed to include any kind of electronic device with data processing circuitry, which includes a computer processing device configured to and operable to execute computer instructions stored, for example, on a computer memory being operatively connected thereto. Examples of such a device include: digital signal processor (DSP), a microcontroller, a field programmable gate array (FPGA), an application specific integrated circuit (ASIC), a laptop computer, a personal computer, a smartphone, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 3:
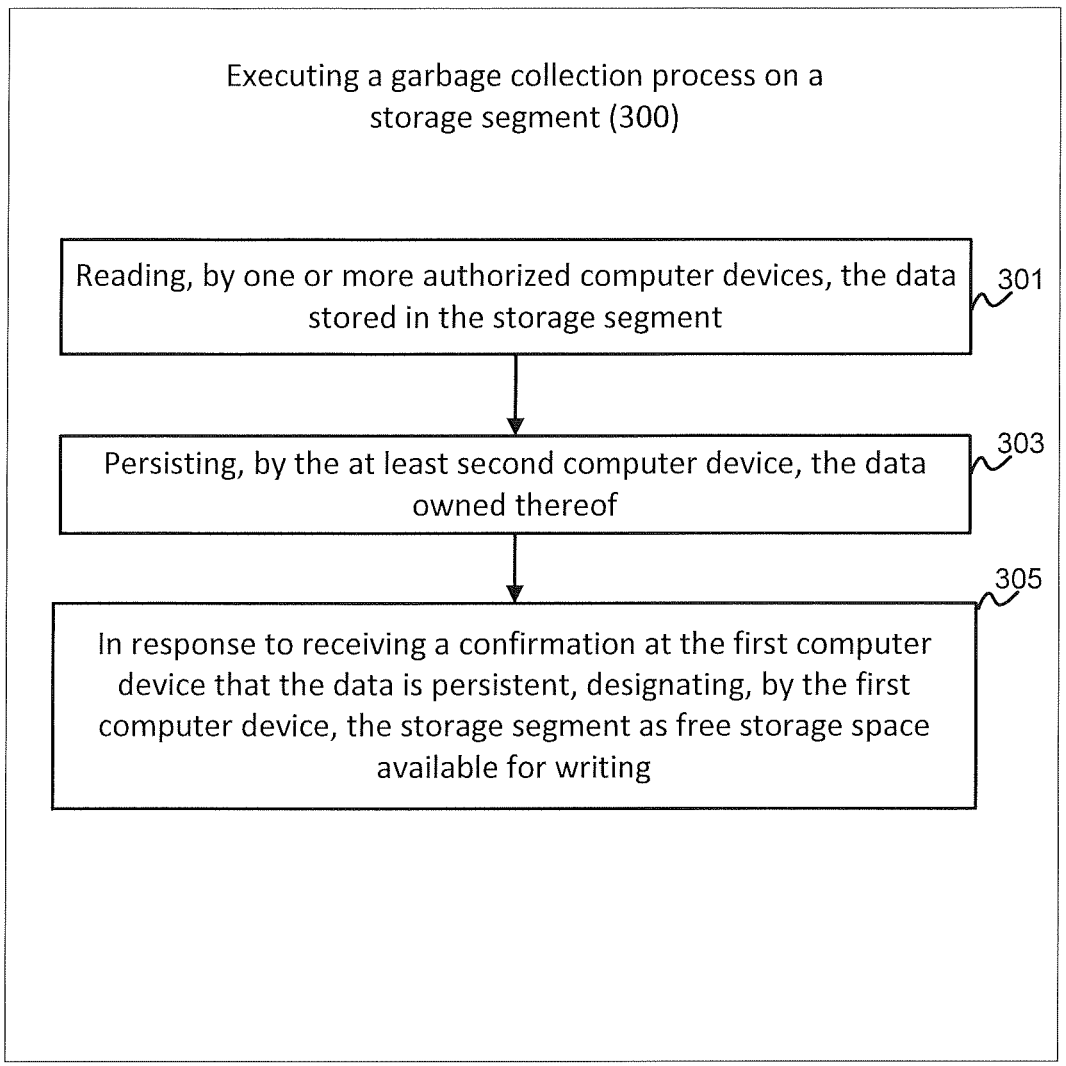
FIG. 3 is a generalized flowchart showing a sequence of operations performed in a garbage collection process in a storage system, according to some examples of the presently disclosed subject matter.

In embodiments of the presently disclosed subject matter, fewer, more and/or different stages than those shown in FIG. 3 may be executed. In embodiments of the presently disclosed subject matter, one or more stages illustrated in FIG. 3 may be executed in a different order and/or one or more groups of stages may be executed simultaneously.

Figure 2:
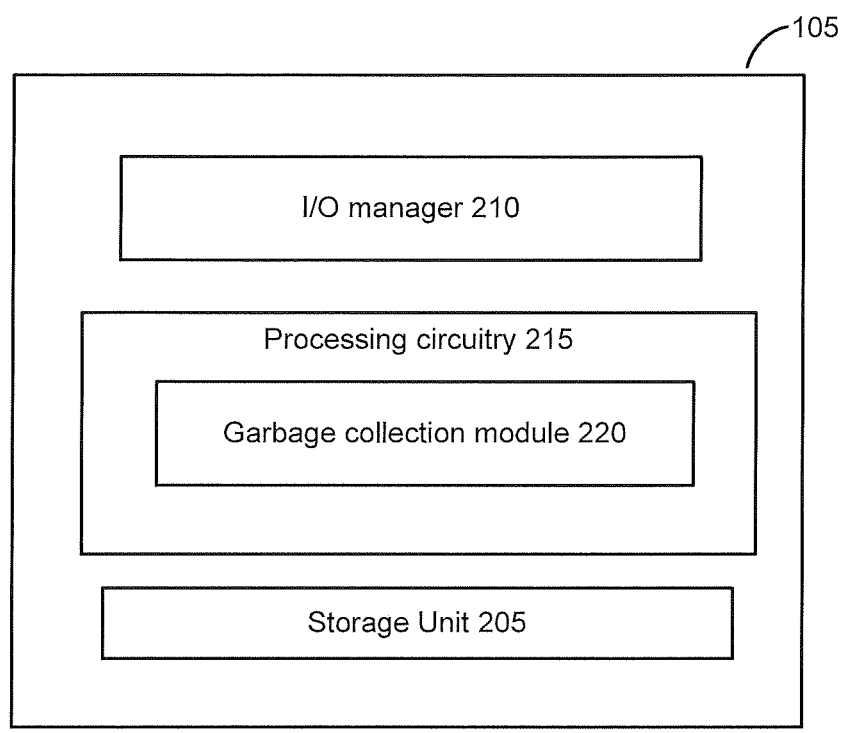
FIG. 2 is a schematic block-diagram illustration of a control unit according to examples of the presently disclosed subject matter.

FIG. 1 to FIG. 2 illustrate various aspects of the system architecture in accordance with some examples of the presently disclosed subject matter. Elements in FIG. 1 to FIG. 2 can be made up of a combination of software and hardware and/or firmware that performs the functions as defined and explained herein. Elements in FIG. 1 to FIG. 2 may be centralized in one location or dispersed over more than one location. In other examples of the presently disclosed subject matter, the system may comprise fewer, more, and/or different elements than those shown in FIG. 1 to FIG. 2. For example, some components of control unit 105 can be implemented as a separate unit in interface layer 110 or implemented on an external server or be otherwise operatively connected to the storage system for enabling management of I/O operations.

Throughout the description and the claims, reference is made to the term "logical unit" (or "LU" in abbreviation, also known as "volume"). The term logical unit is known in the art of computer storage, and the following definition is provided as a non-limiting example only for convenience purposes. Storage systems are often logically divided into logical units (LUs) to obtain a partitioned storage where each LU can be presented and accessed as a separate device. Each logical unit is identified by a respect logical unit number (LUN). For example, according to the small system computer interface (SCSI) standard, a SCSI initiator in a host originates an I/O command sequence that is transmitted to a SCSI target endpoint or recipient storage device. A logical unit is an entity within the SCSI target that responds to the SCSI I/O command.

The term "logical block address" (LBA) or "logical address" (LA) as used herein, relates to the basic reference unit which is used by external hosts to address I/O requests to the storage system. LBAs can be numerical and range from 1-n. A partly or an entirely overlapping LBA range (e.g., 1-n) can be used with multiple, different LUs (e.g., all the LUs) in the storage system, and therefore in order to reference a specific logical block, a reference to the LU with which the logical block is associated may be required. For simplicity, in some examples in the description the I/O requests may reference LBA and the existence of multiple LUs in the storage system is not mentioned. It would be appreciated that this omission is made with the intention of simplifying the description of the examples of the presently disclosed subject matter, and is not intended to limit the scope of the description. Therefore, it would be appreciated that examples of the presently disclosed subject matter contemplate a multi-LU storage system and that the LBAs which are referred to herein can be comprised of a combination of an LBA and a LU ID (e.g., LU number).

Bearing the above in mind, attention is drawn to FIG. 1, which is a schematic block-diagram of a computer storage system, according to some examples of the presently disclosed subject matter. Storage system 100 (e.g. a distributed data-storage system) includes a physical storage space comprising one or more physical storage units ($SU_{1-n}$), each physical storage unit comprising one or more storage devices. Storage devices may be any one of Hard Storage devices (HDD) or Solid State Drives (SSD, comprising for example, a plurality of NAND elements), DRAM, non-volatile RAM, or any other computer storage device or combination thereof. Physical storage units ($SU_{1-n}$) can be consolidated in a single unit, or can be otherwise distributed over one or more computer nodes connected by a computer network.

Storage system 100 can further comprise an interface layer 110 comprising various control units $105_{1-n}$ operatively connected to the shared physical storage space and to one or more hosts ($101_{1-n}$), and configured to control and execute various operations in the storage system (including input and/or output (I/O) operations). Various examples of control units are described in more detail below.

Interface layer 110 can be further configured to provide a virtual storage layer logically representing the physical storage space as well as the required mapping between the physical storage space and its respective logical representation. Different control units $105_{1-n}$ in the interface layer 110 (where a control unit is implemented, in some examples, by a dedicated computer device, e.g., a dedicated computer server device) can be assigned for managing the operation of a certain area within the physical storage space (e.g. an area comprising, for example, one or more designated physical storage units or part thereof).

Communication between hosts ($101_{1-n}$) and interface layer 110, between interface layer 110 and storage units ($SU_{1-n}$) and within interface layer 110 (e.g., between different control unit $105_{1-n}$) can be realized by any suitable infrastructure and protocol. Hosts ($101_{1-n}$) can be connected to the interface layer 110 directly or through a network (e.g. over the Internet). According to one example, communication between various elements of storage system 100 is implemented with a combination of Fiber Channel (e.g. between hosts and interface layer 110), SCSI (e.g. between interface 110 and storage units) and InfiniBand (e.g. interconnecting different control units in interface 110) communication protocols.

FIG. 2 is a schematic block-diagram showing some components of a control unit according to some examples of the presently disclosed subject matter. Control unit 105 can be implemented on a computer device comprising a processing circuitry 215 The processing circuitry 215 is configured to provide all processing necessary for the control unit to function as further detailed below with reference to FIG. 3. The processing circuitry 215 comprises or is otherwise operatively connected to one or more computer processors (not shown separately) and memory (not shown separately). The processor(s) of processing circuitry 215 can be configured to execute one or more functional modules in accordance with computer-readable instructions implemented on a non-transitory computer-readable memory comprised in the processing circuitry. Such functional module(s) are referred to hereinafter as comprised in the processing circuitry.

The control unit 105 can further comprise, by way of example, an I/O manager 210 configured to handle I/O requests received, for example, from host computers $101_{1-n}$, and a storage unit 205 configured to store data and/or metadata, configurations and/or logic which are used by the I/O manager 210 and the processing circuitry 215. According to some examples of the presently disclosed subject matter, the processing circuitry 215, the storage unit 205, and I/O manager 210 can be operatively connected to each other.

According to some embodiments, functional module(s) comprised in the processing circuitry can include a Garbage collection module 220 configured to execute operations related to garbage collection in a storage system as described below with reference to FIG. 3. In one embodiment, the Garbage collection module 220 is configured to executing a garbage collection process on a storage segment, as will be detailed below.

According to some embodiments, I/O manager 210 can be implemented as component distributed over more than one control units. According to some examples, each control unit can comprise a respective I/O manager 210, while according to other examples, one I/O manager may be accessible and operable by more than one control unit. According to some examples, some components of control unit 105 can be implemented as a separate unit in interface layer 110 or implemented on an external server or be otherwise operatively connected to the storage system for enabling management of I/O operations. For example, garbage collection module 220 can be implemented as a separate unit operatively connected to I/O manager 210.

As mentioned above, the presently disclosed subject matter contemplates a distributed storage system with an interface layer 110 configured with multiple control units ($105_1$ to $105n$ as indicated in FIG. 1). As would be apparent to any person skilled in the art, principles described with respect to a single control unit herein can likewise apply to two or more control units in system 100.

According to some examples of the presently disclosed subject matter, control units $101_{1-n}$ can be adapted to read data and/or metadata from the storage ($SU_{1-n}$), and/or write data and/or metadata to the storage ($SU_{1-n}$). According to examples of the presently disclosed subject matter, the logical address space of the storage system 100 is logically partitioned so that for every logical address, there is at least one control unit which is responsible for that logical address (e.g., the data stored thereon) and assigned for handling read and write requests directed to that address. Such control unit can also be recognized as the owner of the logical data stored on the logical address (i.e., having both read and write access to the logical data). According to some examples, there are also one or more control units which are assigned or authorized with only read access directed to that address.

Further by way of example, control units can hold translation tables or implement translation functions which map from logical address to the physical storage space. In some examples (e.g. for the purpose of redundancy and/or efficiency) two or more control units can be assigned to handle I/O requests to the same physical storage area. In some examples, there are at least two control units that are each assigned to handle I/O requests to respective non-overlapping storage areas, such that one control unit cannot access the storage area assigned to the other control unit, and vice versa. In such cases, only a single control unit of the at least two control units is assigned with exclusive write access to a given physical storage area. In other words, there is at least one control unit assigned with access control and write permission to a respective physical storage area which is not accessible to at least one other control unit.

In response to receiving an I/O request, the control unit can be configured to determine with which address (LU, LBA) the I/O request is associated. The control unit can use address mapping tables (or mapping functions) to determine, based on the logical address referenced in the I/O request, to which storage location in the physical storage to address the I/O request.

Having provided a high level description of the various components of the storage system, more details are now provided with respect to operation of the storage system.

FIG. 3 is a generalized flowchart showing a sequence of operations performed in a garbage collection process in a storage system, according to some examples of the presently disclosed subject matter.

Operations described with reference to FIG. 3 can be executed for example, by interface layer 110 and more specifically by one or more control units 105 described above. It should be appreciated, that while some operations are described with reference to components of system 100 and its components presented above, this is done by way of example only, and this should not be construed to limit the operations to being implemented on such components alone.

As described above, the storage system (also referred to herein as a distributed data-storage system) described herein comprises multiple control units (also referred to herein as computer devices). The multiple computer devices can be operatively connected to a shared physical storage space of the storage system which is operable by the multiple computer devices. The shared physical storage space can comprise one or more storage devices. Each computer device can be assigned with write access to a respective physical storage area in the storage system. Since the logical address space of the storage system is logically partitioned, for each given logical address, there is at least one computer device which is responsible for that address (e.g., the data stored thereon) and assigned for handling I/O requests (e.g., read and write requests) directed to that address. Such computer device is also referred to as the owner of the logical data stored on that logical address, i.e., the data is owned by the computer device. According to some examples, there are also one or more computer devices which are assigned or authorized with only read access directed to that address and the data stored thereon.

According to certain embodiments, in case of, e.g., an update operation, new data and/or metadata are written into free storage space within the storage system, and upon the write operation is completed, the previous location of the old data and/or metadata becomes invalid. It is to be noted that, for purpose of illustration and simplicity of the description, certain embodiments of the following description are provided with respect to the term data. The term data should be interpreted as including the actual data and/or metadata that assigns to the actual data. In some cases, the actual data and metadata can have the same owner. In some other cases, the actual data and metadata can have respective owners.

To gain performance, each control unit or computer device can aggregate multiple write operations of data and write them to a free storage segment. A storage segment refers to a segment with a sufficient size for storing data. For example, a storage segment can be in the size of several Megabytes. However, it is noted that the storage segment is not limited to a fixed size. The storage segment can refer to a segment in the physical storage space, or alternatively it can refer to a segment in the logical representation. In one example, the storage segment can be a sequential storage segment which is a continuous segment in the physical storage space. Although the new data can be written sequentially, the invalid previous locations of the old data are not necessarily sequential. As a result, over time, the storage space becomes fragmented with valid and invalid locations of data and/or metadata located closely to one another. Therefore, there is a need for free storage space to contain large enough free areas, or to be sequential to a certain degree. A garbage collection process can be run as a background process in such storage systems. Such a process reads valid data from the fragmented storage locations, rewrites them sequentially to free storage space, and generates additional free storage space in the storage system.

In some cases, a storage segment that is decided to be garbage collected can contain valid data owned by multiple control units. Garbage collection in such cases can be challenging. Such situation may be caused, e.g., by certain management operations in the storage system, such as, e.g., adding and/or removing control units. These operations may cause a switch of the logical address ownerships assigned to the control units. By way of example, new control unit(s) can be added into a storage system without adding additional storage space into the system. For exemplary purposes only, assume in a storage system there were originally two control units: control unit A being responsible for LBA 1-5 and control unit B responsible for LBA 6-10. A new control unit C is now added into the storage system without new storage space being assigned to the storage system. Therefore, the logical address 1-10 needs to be redistributed or reassigned among all three control units, causing a switch of address ownership. Namely, in this specific example, after the ownership reassignment, A will be responsible for LBA 1-3, B for LBA 4-6, and C for LBA 7-10. The ownership of LBA 4-5 has been switched from control unit A to control unit B. However, following the immediate address ownership reassignment, even though data in a given logical address is still owned by a single control unit, there may be storage locations or segments which contain valid data and/or metadata owned by multiple control units. In the above example, the storage segment of LBA 1-5 now contain data owned by two control units A and B.

In some cases, a storage segment can contain data owned by at least a computer device that is different from the one that has the write access to the storage segment. In the above example, due to the ownership reassignment, it is possible that the data stored in storage segment of LBA 1-5 are owned by control unit B while control unit A has the write access to the storage segment. A proposed garbage collection process can be executed in the above described scenarios in order to create a larger free storage space.

According to certain embodiments, the location of the storage segment to be garbage collected can be predetermined. By way of example, one master control unit in the interface layer 110 can choose a location from all storage locations in the storage system to be garbage collected. By way of another example, the responsibility of making such decision can be distributed between the control units such that each control unit can select only from storage locations under its own responsibility (i.e., storage locations which are assigned to the control unit and to which it has the write access). For instance, a first control unit (i.e., a first computer device) can decide to garbage-collect one storage segment under its responsibility.

Once the location of the storage segment to be garbage collected is determined, a garbage collection process can be executed (300) (e.g., by the garbage collection module 220 illustrated in FIG. 2) on the storage segment. Continue with the above example, assume that the write access of the storage segment is (exclusively) assigned to a first computer device in the storage system and the storage segment storing data owned by at least a second computer device in the storage system. It is to be noted that in some cases write access can be made as permanent, and in some other cases it can be reassigned during the lifetime of the system, due to various system considerations relating to assignment of physical capacity to controllers. It is also to be noted that the term "first" as used throughout the specification, figures and claims does not mean the very first computer device, etc.; rather it is used to distinguish from a "second" (a different) computer device, etc. In some cases, the at least a second computer device can be one computer device (i.e., the second computer device) that is different from the first computer device. In other cases, the at least a second computer device can include a plurality of computer devices, and the data stored in the storage segment can include different data portions respectively owned by the plurality of computer devices. The plurality of computer devices can include a second computer device which is different from the first computer device. Optionally, the plurality of computer devices can also include the first computer device.

The execution of the garbage collection process as described below can be performed periodically as an automatic process. Additionally or alternatively it can also be triggered by a manual input.

Referring to FIG. 3 now, the data stored in the storage segment can be read (301), e.g., by one or more authorized computer devices. The authorized computer devices refer to the computer devices that are authorized with a read access to the data stored in the storage segment. By way of example, the authorization can be given by the owner(s) of the data (e.g., the at least second computer device), e.g., resulted from coordination or association between these computer devices and the owner(s) of the data. According to certain embodiments, the one or more authorized computer devices can be the owner(s) of the data, i.e., the at least second computer device. In such cases, prior to the reading, a request can be sent, e.g., by the first computer device, to the owner(s) of the data for relocating their respective data portions. Upon receiving the request, the owner(s) read from the storage segment their respective data portions. According to some embodiments, the one or more authorized computer devices can be different from the at least second computer device. In such cases, the data can be read by the one or more authorized computer devices, and then sent or distributed to the at least second computer device to be persisted. By way of example, the one or more authorized computer devices can be a single control unit (e.g., the first computer device, or another computer device) which reads all the data and distributes the data to the at least second computer device, according to address ownership stored in the interface layer.

Once the data is read and each of the owner(s) of the data has a copy of the valid data and/or metadata which it owns from the storage segment, the data can be persisted (303), by the at least second computer device. According to certain embodiments, the data can be persisted to a storage medium owned by the at least second computer device. Persisting data is known in the art, and refers to storing data such that the data can be read and accessed in the present disclosure. By way of example, the storage medium can be free storage space in the storage system. For instance, each of the data portion(s) can be respectively written by the owner thereof into separate free storage space in the storage system owned by the owner. The storage medium can also be, e.g., a non-volatile storage medium including any one of the following: Hard Storage devices (HDD) or Solid State Drives (SSD, comprising for example, a plurality of NAND elements), DRAM, non-volatile RAM, or any other computer storage device or combination thereof.

Once each owner completes to persist its own data portion, a confirmation will be sent from the at least second computer device to the first computer device that the data is persistent. In response to receiving the confirmation, the first computer device can designate (305) or set the storage segment as free storage space available for writing. For instance, the first computer device who has the write access to the storage segment can write new sequential data into the storage segment.

During the above process, as each control unit writes data that it owns, the data structures on each control unit are maintained up to date and each control unit can continue to serve I/O to these logical addresses.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computerized method of garbage collection in a storage system, the storage system comprising multiple computer devices operatively connected to a shared physical storage space of the storage system operable by the multiple computer devices, each computer device being assigned with write access to a respective storage area in the shared physical storage space, the method comprising:
   executing a garbage collection process on a storage segment, the write access of the storage segment being assigned to a first computer device in the storage system, the storage segment storing data owned by at least a second computer device, which is assigned for handling read and write requests directed to a logical address of the data, the second computer device being different from the first computer device, the executing including:
   reading, by the at least second computer device, the data stored in the storage segment;

persisting, by the at least second computer device, the data owned thereof to a storage medium owned by the at least second computer device; and in response to receiving a confirmation at the first computer device that the data is persistent, designating, by the first computer device, the storage segment as free storage space available for writing by the first computer device.

2. The computerized method according to claim 1, wherein the at least second computer device includes a plurality of computer devices, and wherein the data include different data portions respectively owned by the plurality of computer devices, and wherein the persisting comprises persisting, respectively by the plurality of computer devices, different data portions owned thereof.

3. The computerized method according to claim 1, wherein the storage medium is free storage space in the storage system.

4. The computerized method according to claim 1, further comprising:

writing, by the first computer device, new data into the storage segment.

5. The computerized method according to claim 1, wherein the write access of the storage segment is exclusively assigned to the first computer device in the storage system.

6. A distributed data-storage system comprising multiple computer devices operatively connected to a shared physical storage space of the data-storage system operable by the multiple computer devices, each computer device being assigned with write access to a respective storage area in the shared physical storage space, the data-storage system configured to:

execute a garbage collection process on a storage segment, the write access of the storage segment being assigned to a first computer device in the data-storage system, the storage segment storing data owned by at least a second computer device, which is assigned for handling read and write requests directed to a logical address of the data in the data-storage system, the second computer device being different from the first computer device;

wherein:

the at least second computer device in the data-storage system is configured to read the data stored in the storage segment;

the at least second computer device is configured to persist the data owned thereof to a storage medium owned by the at least second computer device; and the first computer device is configured to, in response to receiving a confirmation that the data is persistent, designate the storage segment as free storage space available for writing by the first computer device.

7. The data-storage system according to claim 6, wherein the at least second computer device includes a plurality of computer devices, and wherein the data include different data portions respectively owned by the plurality of computer devices, and wherein the plurality of computer devices are configured to persist respectively different data portions owned thereof.

8. The data-storage system according to claim 6, wherein the storage medium is free storage space in the storage system.

9. The data-storage system according to claim 6, wherein the first computer device is further configured to write new data into the storage segment.

10. The data-storage system according to claim 6, wherein the write access of the storage segment is exclusively assigned to the first computer device in the storage system.

11. A distributed data-storage system comprising multiple computer devices operatively connected to a shared physical storage space of the data-storage system operable by the multiple computer devices, each computer device being assigned with write access to a respective storage area shared physical storage space, a first computer device in the data-storage system configured to:

execute a garbage collection process on a storage segment, the write access of the storage segment being assigned to the first computer device, the storage segment storing data owned by at least a second computer device, which is assigned for handling read and write requests directed to a logical address of the data, the second computer device being different from the first computer device, wherein the first computer device is configured to:

cause the data stored in the storage segment to be read and persisted by the at least second computer device; and in response to receiving a confirmation from the at least second computer device that the data is persistent, designate the storage segment as free storage space available for writing by the first computer device.

12. A non-transitory computer readable storage medium tangibly embodying a program of instructions that, when executed by a computer, causing the computer to perform a method of garbage collection in a storage system, the storage system comprising multiple computer devices operatively connected to a shared physical storage space of the storage system operable by the multiple computer devices, each computer device being assigned with write access to a respective storage area in the shared physical storage space, the method comprising:

executing a garbage collection process on a storage segment, the write access of the storage segment being assigned to a first computer device in the storage system, the storage segment storing data owned by at least a second computer device, which is assigned for handling read and write requests directed to a logical address of the data, the second computer device being different from the first computer device, the executing including:

reading, by the at least second computer device, the data stored in the storage segment;

persisting, by the at least second computer device, the data owned thereof to a storage medium owned by the at least second computer device; and in response to receiving a confirmation at the first computer device that the data is persistent, designating, by the first computer device, the storage segment as free storage space available for writing by the first computer device.

* * * * *